United States Patent
Galligan et al.

(10) Patent No.: US 7,981,390 B2
(45) Date of Patent: Jul. 19, 2011

(54) SMALL ENGINE PALLADIUM CATALYST ARTICLE AND METHOD OF MAKING

(75) Inventors: Michael P. Galligan, Cranford, NJ (US); Xinsheng Liu, Edison, NJ (US); Pascaline H. Tran, Holmdel, NJ (US); Young Gin Kim, Edison, NJ (US); Ye Liu, Holmdel, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/644,113

(22) Filed: Dec. 22, 2009

(65) Prior Publication Data

US 2010/0158780 A1  Jun. 24, 2010

Related U.S. Application Data

(60) Provisional application No. 61/140,343, filed on Dec. 23, 2008, provisional application No. 61/140,418, filed on Dec. 23, 2008, provisional application No. 61/140,419, filed on Dec. 23, 2008.

(51) Int. Cl.
*B01D 53/94* (2006.01)
*B01J 23/44* (2006.01)
*B01J 37/00* (2006.01)
*F01N 3/10* (2006.01)

(52) U.S. Cl. ............... 423/213.5; 423/239.1; 423/245.3; 502/339; 502/304; 502/349; 502/303; 502/514; 502/439; 502/527.12; 502/527.13; 60/299

(58) Field of Classification Search ............ 502/339, 502/304, 349, 303, 514, 439, 527.12, 527.13; 423/213.5, 239.1, 245.3; 60/299
See application file for complete search history.

(56) References Cited

U.S. PATENT DOCUMENTS

| | | | |
|---|---|---|---|
| 3,447,893 A * | 6/1969 | Hirschler, Jr. et al. ..... 423/213.2 |
| 4,171,288 A | 10/1979 | Keith et al. |
| 4,714,694 A | 12/1987 | Wan et al. |
| 5,057,483 A | 10/1991 | Wan |
| 5,597,771 A | 1/1997 | Hu et al. |
| 5,721,188 A * | 2/1998 | Sung et al. ................... 502/439 |
| 5,898,014 A | 4/1999 | Wu et al. |
| 6,478,874 B1 | 11/2002 | Rosynsky et al. |
| 6,764,665 B2 | 7/2004 | Deeba et al. |
| 6,875,408 B1 * | 4/2005 | Yamamoto et al. ........... 422/180 |
| 6,921,738 B2 * | 7/2005 | Hwang et al. ................ 502/240 |
| 7,022,646 B2 | 4/2006 | Li |
| 2002/0048542 A1 | 4/2002 | Deeba et al. |
| 2005/0282701 A1 | 12/2005 | Foong et al. |
| 2006/0142151 A1 | 6/2006 | Taki et al. |
| 2006/0171866 A1 | 8/2006 | Galligan |
| 2008/0044329 A1 | 2/2008 | Chen et al. |
| 2010/0135879 A1 * | 6/2010 | Roesch et al. ............. 423/213.5 |

FOREIGN PATENT DOCUMENTS

| | | |
|---|---|---|
| CN | 1712133 | 12/2005 |
| CN | 1817449 | 8/2006 |
| WO | 9535152 A1 | 12/1995 |
| WO | WO-95/35152 | 12/1995 |

OTHER PUBLICATIONS

Lee, Chiou-Hwang et al., "Effect of K2O on a Pd-Containing Catalytic Converter for Removing CO and HC Emissions from a Two-Stroke Motorcycle", *Ind. Eng. Chem. Res.*, 37, (1998), 1260-1266 pgs.

Wu, Hsiao-Chung et al., "Emission Control Technologies for 50 and 125 cc Motorcycles in Taiwan", *SAE Technical Papers Series*, #980938 (Feb. 23-26, 1998), 12 pgs.

Summers, J. C., et al., "Uses of Palladium in Automotive Emission Control Catalysts", *SAE Technical Paper Series*, #880281 (Feb. 29-Mar. 4, 1988), 22 pgs.

Zhou, Zexing et al., "Catalytic purification of exhaust from methanol-fueled internal combustion engine", *Huanjing Kexue* (1987), 8(2), 39-45, 7 pgs.

* cited by examiner

*Primary Examiner* — Timothy C Vanoy
(74) *Attorney, Agent, or Firm* — Scott S. Servilla; Diehl Servilla LLC; Melanie L. Brown

(57) ABSTRACT

Catalyst articles comprising substantially only a palladium precious metal component and related methods of preparation and use are disclosed. Disclosed is a catalyst article comprising a first layer formed on a carrier substrate, wherein the first layer comprises a refractory metal oxide and has a surface that is substantially uniform; and a second layer formed on the first layer, wherein the second layer comprises i) an oxygen storage component that is about 50-90% by weight of the second layer and ii) a palladium component in an amount of about 10-150 g/ft$^3$ of palladium, wherein the palladium component is substantially the only platinum group metal component. One or more improved properties are exhibited by the catalyst article.

20 Claims, No Drawings

SMALL ENGINE PALLADIUM CATALYST ARTICLE AND METHOD OF MAKING

CROSS-REFERENCE TO RELATED APPLICATIONS

This application claims the benefit of priority under 35 U.S.C. §119(e) to U.S. Provisional Application Ser. Nos. 61/140,343, filed Dec. 23, 2008, 61/140,418, filed Dec. 23, 2008, and 61/140,419, filed Dec. 23, 2008, which are incorporated herein by reference in their entirety.

TECHNICAL FIELD

This invention pertains to catalyst articles useful for treatment of gaseous streams containing hydrocarbons and nitrogen oxides, methods of using the catalyst articles to treat the gaseous streams, systems including the catalytic articles, and methods of making the catalyst articles. More particularly, the invention provides catalyst articles and methods for treatment of exhaust produced by small engines.

BACKGROUND

The exhaust gases of internal combustion engines, including small engines, are known to contain pollutants such as hydrocarbons, carbon monoxide and nitrogen oxides ($NO_x$) that foul the air.

Small internal combustion engines, usually two-stroke and four-stroke spark ignition engines are used to provide power to a variety of machinery, e.g. gasoline-engine powered lawn mowers, chain saws, leaf blowers, string cutters, motor scooters, motorcycles, mopeds and the like. Such engines provide a severe environment for a catalytic exhaust treatment apparatus. This is because in small engines, the exhaust gas contains a high concentration of unburned fuel and unconsumed oxygen. A catalyst article can be mounted downstream of the engine inside another structure such as a muffler. Examples of catalytic articles mounted inside of mufflers are described in United States Patent Application Publication No. 20040038819, the entire content of which is incorporated herein by reference.

Additionally, the vibration of a two-stroke engine can be three or four times that of a four-stroke engine. For example, vibrational accelerations of 70 G to 90 G (G=gravitational acceleration) at 150 hertz (Hz) have been reported for small engines. The harsh vibration and exhaust gas temperature conditions associated with small engines lead to several modes of failure in the exhaust gas catalytic treatment apparatus, including failure of the mounting structure by which a catalyst article is secured in the apparatus and consequential damage or destruction of the catalyst article due to the mechanical vibration and to flow fluctuation of the exhaust gas under high temperature conditions. The catalyst article usually comprises a ceramic-like carrier that has a plurality of fine parallel gas flow passages extending therethrough (sometimes referred to as a "honeycomb") and which is typically made of e.g., cordierite, mullite, etc., on which a catalytic materials is coated. The ceramic-like material is subject to cracking and pulverization by excessive vibration and exposure to extremely high space velocities (i.e., the amount of air flowing through the catalyst article, which may be 400-500 K or higher). While ceramic and metal monolithic honeycomb catalysts are known to be used in small engine applications, it is desirable to have alternative designs which are adapted to the smaller space, extreme operating conditions and lower overall cost of small engines. In such cases, metal carriers such as metal plates and metal wire mesh have been used. Although metal wire mesh can be easily adapted to small spaces and is relatively inexpensive its flexibility makes it prone to degradation of the catalytic layer under the extreme vibration and air flow conditions of a small engine, thus shortening the useful life of the catalyst.

Catalysts useful in small engine applications are described in United States Patent Application Publication No. 20060171866, the entire content of which is hereby incorporated by reference. Briefly, such catalysts comprise one or more platinum group metal compounds or complexes which can be on a suitable support material. The term "compound" means any compound, complex or the like of a catalytic component which, upon calcinations or use of the catalyst, decomposes or otherwise converts to a catalytically active form, which is often an oxide or metal. Various compounds or complexes of one or more catalytic components may be dissolved or suspended in any liquid which will wet or impregnate the support material.

Three-way conversion (TWC) catalysts have utility in a number of fields including the treatment of exhaust gas streams from internal combustion engines, such as automobile, truck and other gasoline-fueled engines. Emission standards for unburned hydrocarbons, carbon monoxide and nitrogen oxide contaminants have been set by various governments and must be met by older as well as new vehicles. In order to meet such standards, catalytic converters containing a TWC catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Known TWC catalysts which exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. The TWC catalyst carrier may also be a wire mesh, typically a metal wire mesh, which is particularly useful in small engines. TWC catalysts can be manufactured in many ways. U.S. Pat. No. 6,478,874, for example, sets forth a system for catalytic coating of a substrate. Details of a TWC catalyst are found in, for example, U.S. Pat. Nos. 4,714,694 and 4,923,842. U.S. Pat. Nos. 5,057,483; 5,597,771; 7,022,646; and WO95/35152 disclose TWC catalysts having two layers with precious metals. U.S. Pat. No. 6,764,665 discloses a TWC catalyst having three layers, including a palladium layer having substantially no oxygen storage components. U.S. Pat. No. 5,898,014 discloses catalyst compositions containing oxygen storage components.

Refractory metal oxides such as alumina, bulk ceria, zirconia, alpha alumina and other materials are known for use as a support for the catalytic components of a catalyst article. The alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Although many of the other refractory metal oxide supports suffer from the disadvantage of having a considerably lower BET surface area than activated alumina, that disadvantage tends to be offset by a greater durability of the resulting catalyst.

In an operating engine, exhaust gas temperatures can reach 600° C. and catalyst out temperatures can exceed 1000° C. Such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith et al., U.S. Pat. No. 4,171,288, the entire content of which is incorporated herein by reference.

Of the platinum group metals, palladium (Pd) is of particular interest for gasoline engine emission control because of its lower cost relative to platinum (Pt) and rhodium (Rh), its greater availability relative to platinum and its performance advantages relative to other platinum group metals under certain operating conditions. However, in spite of price and availability advantages, there are several problems associated with the use of palladium as the only catalytic material in catalyst articles. Palladium is less resistant to poisoning by fuel and motor oil contaminants than platinum. It is also inferior to platinum in its ability to convert short chain saturated hydrocarbons such as ethane and propane. These disadvantages are partially off-set by the durability of palladium, i.e., it is more resistant to sintering than platinum. Nevertheless, the cost advantages of a palladium-only catalyst article are particularly important for meeting exhaust treatment requirements in the less expensive types of machines that incorporate small engines. There is still a need for a palladium-only catalyst article with improved durability and performance in the harsh environment of the small engine. The present invention addresses this need.

SUMMARY

An embodiment of the present invention is directed to a palladium-only catalyst article and related methods of preparation and use. The catalyst article comprises a first layer formed on a carrier substrate, wherein the first layer comprises a refractory metal oxide and has a surface that is substantially uniform; and a second layer formed on the first layer, wherein the second layer comprises i) an oxygen storage component that is about 50-90% by weight of the second layer and ii) a palladium component in an amount of about 10-150 g/ft$^3$ of palladium, wherein the palladium component is substantially the only platinum group metal component. In one embodiment, the catalyst article exhibits improved durability and performance relative to known palladium-only catalyst articles used in small engines, and is effective to maintain total hydrocarbons and nitrogen oxides in an exhaust stream from a 25 cc engine at less than 50 g/kW hour when the 25 cc engine is run at 7500 rpm for more than 100 hours. The carrier of the catalyst article may be a wire mesh, which is a carrier particularly suitable for use in small engines due to size constraints. The catalyst article may further comprise a third layer which comprises a third layer formed on the second layer, the third layer comprising an oxygen storage component that is about 50-90% by weight of the third layer and a platinum group metal component consisting of about 10-150 g/ft$^3$ of palladium.

In another aspect of the invention, the palladium-only catalyst article is made by coating on a carrier a first layer comprising a refractory metal oxide in an acidic sol, drying the first layer using heat and airflow such that a substantially uniform surface is formed on the first layer, depositing a second layer on the first layer by coating a slurry on the first layer, the slurry comprising an oxygen storage component that provides about 50-90% by weight of the oxygen storage component in the second layer and a refractory metal oxide impregnated with a palladium component, wherein the palladium component is substantially the only platinum group metal component and is present in an amount sufficient to provide about 10-150 g/ft$^3$ of palladium in the second layer, and drying the second layer.

The catalyst articles of the invention are particularly useful for treating exhaust produced by small engines, where operating conditions produce high vibration and air flow velocities.

DETAILED DESCRIPTION

The present invention relates to catalyst articles, components of catalyst articles, methods of using the catalyst articles and methods of making the catalyst articles generally referred to as a three-way conversion catalyst having the capability of simultaneously catalyzing the oxidation of hydrocarbons and carbon monoxide and the reduction of nitrogen oxides. The catalytic article according to an embodiment of the invention comprises at least two washcoat layers. It has been found that by providing a substantially uniform surface on a first undercoat layer formed on the carrier, the undercoat exhibits improved adherence for a second catalytic layer formed on the undercoat layer. The catalytic layer therefore has improved durability and performance as compared to conventional multilayer catalyst articles. That is, the catalytic layer of the invention resists cracking and being dislodged from the catalyst article under operating conditions of harsh vibration, such as in a small engine. Accordingly, less platinum group metal is required in the catalyst article, as the ability of the catalyst article to meet regulatory requirements for emissions control is less impacted by physical depletion of the catalytic layer during use of the small engine over time.

As used herein, the term "substantially uniform" with respect to a layer of the catalyst article means the surface of the layer is free of defects over at least about 90% of the total surface area. The substantially uniform surface exhibits no more than about 10% of the total surface area of the layer of cracks, fissures or flaking of the surface of the layer. In certain aspects of the invention, the surface of the layer is at least about 95% defect-free, and in a detailed aspect of the invention it is 100% defect-free. Evaluation of the uniformity of the surface of the layer is readily performed using procedures known in the art, including metallography, scanning electron microscopy (SEM), transmission electron microscopy (TEM) and direct visual inspection of the surface of the layer using, for example, a conventional light microscope.

As used herein, the term "support" with respect to a catalytic layer refers to a material that receives platinum group metals, stabilizers, promoters, binders, and the like through association, dispersion, impregnation, or other suitable methods. Examples of supports include, but are not limited to, refractory metal oxides, high surface area refractory metal oxides and materials containing oxygen storage components. One or more embodiments of the present invention include a high surface area refractory metal oxide support comprising an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of materials containing oxygen storage components include, but are not limited to, ceria-zirconia, ceria-zirconia-lanthana, yttrium oxides and praseodymium oxides. Reference to a "ceria-zirconia composite" means a composite comprising ceria and zirconia, without specifying the amount of either component. Suitable ceria-zirconia materials include, but are not limited to, materials having, for example, 5%, 10%, 15%, 20%, 25%, 30%, 35%, 40%, 45%, 50%, 55%, 60%, 65%, 70%, 75%, 80%, 85%, 90% or even 95% of ceria content. Certain embodiments provide that the support comprises bulk ceria having a nominal ceria content of 100% (i.e., >99% purity).

As used herein, the term "oxygen storage component" (OSC) refers to an entity that has multi-valence state and can actively react with oxidants such as oxygen or nitrous oxides under oxidative conditions, or reacts with reductants such as carbon monoxide (CO) or hydrogen under reduction conditions. Examples of suitable oxygen storage components include ceria and praseodymia. Delivery of an OSC to the layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

As used herein, the term "impregnated" means that a platinum group metal-containing solution is put into pores of a support. In detailed embodiments, impregnation of platinum group metals is achieved by incipient wetness, where a volume of diluted platinum group metal is approximately equal to the pore volume of the support bodies. Incipient wetness impregnation generally leads to a substantially uniform distribution of the solution of the precursor throughout the pore system of the support.

As used herein, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds include palladium nitrate. During the calcination step, or at least during the initial phase of use of the composite, such compounds are converted into a catalytically active form of the metal or a compound thereof.

In a first aspect, the catalyst article of the invention comprises: an undercoat layer on a carrier, the undercoat comprising a refractory metal oxide, and a catalytic layer on the undercoat layer comprising a high level of an OSC and a palladium component, wherein the palladium component is substantially the only platinum group metal component. There is no platinum group metal component in the undercoat layer. Other aspects of the invention provide that the undercoat layer further comprises a high surface area refractory metal oxide, for example a refractory metal oxide having a surface area of about 200 m$^2$/g such as GA-200° L. (available from BASF Catalysts LLC).

In a further aspect, the OSC is a ceria-zirconia material, which may be present as 50-90%, 60-80% or 65-70% by weight of the catalytic layer.

In a detailed embodiment, the ceria-zirconia material further comprises lanthana, neodymia, praseodymia, samarium, yttria, or combinations thereof. The ceria-zirconia material can comprise lanthana in an amount in the range of 1-10% by weight to the ceria-zirconia composite.

Another aspect provides that the palladium component is associated onto a refractory metal oxide support in an amount of at least 0.1% by weight. Palladium may also be associated onto the refractory metal oxide support in an amount of about 1% to 10%, or about 4% to 5%, by weight of the support.

Other aspects of the invention provide that the catalytic layer comprises a refractory metal oxide, such as a high surface area refractory metal oxide. In one or more embodiments, the refractory metal oxide comprises an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. It is particularly desirable that the refractory metal oxide exhibits high temperature resistance. It is also useful in the invention to provide two different refractory metal oxide supports in the catalytic layer, each impregnated with the palladium component. For example the catalytic layer may comprise MI-2005La (W.R. Grace) (for its high temperature resistance) and GA-200L (for its high surface area) as supports for the palladium component.

In a further aspects of the invention, the catalytic layer may further comprise a promoter selected from the group consisting of BaO, SrO, La$_2$O$_3$, Nd$_2$O$_3$, Pr$_6$O$_{11}$, Y$_2$O$_3$, Sm$_2$O$_3$, and combinations thereof.

Other aspects provide methods for treating a gas comprising hydrocarbons and nitrogen oxides, the method comprising: contacting the gas in an exhaust stream of a gasoline engine with a catalytic material on a carrier, the catalytic material comprising a high level of ceria-zirconia and a palladium component, wherein the palladium component is substantially the only platinum group metal component, wherein the catalytic material is coated on an undercoated carrier and wherein the undercoat has a surface that is substantially uniform.

One aspect provides a catalyst article comprising: a catalytic material on a carrier, the catalytic material comprising 50-90% by weight of an OSC comprising ceria-zirconia and a palladium component, wherein the palladium component is substantially the only platinum group metal component, wherein the catalytic material is coated on an undercoat comprising a high surface area refractory metal oxide comprising lanthana-alumina. In a further aspect, the palladium component of the catalytic material is impregnated on each of two different lanthana-alumina supports.

In one embodiment, emissions of hydrocarbons and nitrogen oxides are reduced for substantially longer periods of small engine aging using the catalyst article of the invention as compared to a conventional TWC catalyst (4Pt/10Pd/1Rh) when both catalysts incorporate the same total level of platinum group metal component. Specifically, the catalyst article of an embodiment of the invention is effective to maintain HC+NO$_x$ emissions from a 25 cc utility engine below 50 g/kW hr. for significantly more than 100 hrs. when the engine is run at 7500 rpm. In experimental testing, the catalyst article of an embodiment of the invention did not reach the 50 g/kW hr. emissions limit even at 150 hrs. of engine aging, whereas the conventional TWC catalyst article lost emission control effectiveness much more rapidly, reaching 50 g/kW hr. of HC+NO$_x$ at 100 hrs. of engine aging. Many small engines are two stroke or four stroke engines that are calibrated on the rich side of stoichiometric, and therefore, air is injected into the exhaust to promote complete oxidation, and the catalytic article can encounter temperatures up to and in excess of 500 C. As used herein, "rich" refers to a lambda lambda value in the range of about 0.9 and 1, specifically, in the range of about 0.94 to 0.98, and more specifically, in the range of about 0.95 to 0.97. Such a regime is especially applicable to small engines.

In detailed aspects, the oxygen storage component is present in an amount of 60-80% (or in other aspects 65-70%) by weight of the catalytic layer.

One or more embodiments provide that the palladium component is present in an amount of about 10-150 g/ft$^3$, about 20-100 g/ft$^3$, or about 25-75 g/ft$^3$. In a specific embodiment, the palladium component is present in an amount of about 65-70 g/ft$^3$ in the catalytic layer.

A detailed embodiment provides two layers on the carrier. A first layer coated on the carrier is an undercoat layer comprising a refractory metal oxide such as lanthana-alumina. The first undercoat layer is coated and dried on the carrier such that its surface is substantially uniform, i.e., substantially free of defects such as cracks, fissures and flaking. In one aspect the surface of the undercoat layer is at least 90% defect-free (or about 95% or about 100% defect-free). The substantial uniformity of the undercoat layer provides excellent adherence of a second, catalytic layer that is coated on the undercoat layer. The second layer comprises an OSC component in a high amount (in certain aspects 50-90%, 60-80% or 65-70% by weight of the second layer) and a palladium component, wherein the palladium component is substantially the only platinum group metal component (in certain aspects about 10-150 g/ft$^3$, about 20-100 g/ft$^3$, about 25-75 g/ft$^3$ or about 65-70 g/ft$^3$ of palladium). The OSC component of the second layer may be ceria-zirconia-lanthana and the refractory metal oxide of the first layer may be a high surface area lanthana-alumina, for example having a surface area of about 200 m$^2$/g. The second layer further comprises at least one refractory metal oxide, such as lanthana-alumina, on which is impregnated the palladium component.

A second detailed embodiment provides three layers on the carrier. A first layer coated on the carrier is an undercoat layer comprising a refractory metal oxide such as lanthana-alumina. The first undercoat layer is coated and dried on the carrier such that its surface is substantially uniform, i.e., substantially free of defects such as cracks, fissures and flaking. In one aspect the surface of the undercoat layer is at least 90% defect-free (or about 95% or about 100% defect-free). The substantial uniformity of the undercoat layer provides excellent adherence of a second, catalytic layer that is coated on the undercoat layer. The second layer comprises an OSC component in a high amount (in certain aspects 50-90%, 60-80 or 65-70% by weight of the second layer) and a platinum group metal component consisting of palladium (in certain aspects about 10-150 g/ft$^3$, about 20-100 g/ft$^3$, about 25-75 g/ft$^3$ or about 65-70 g/ft$^3$ of palladium). A third layer coated on the second layer comprises the same components as the second layer. The OSC in the second and/or third layers may be ceria-zirconia-lanthana and the refractory metal oxide in the first layer may be a high surface area lanthana-alumina, for example having a surface area of about 200 m$^2$/g. The second and third layers further each comprise at least one refractory metal oxide, such as lanthana-alumina, on which is impregnated the palladium component.

In another aspect, provided is a method for treating a gas comprising hydrocarbons, carbon monoxide, and nitrogen oxides, the method comprising: contacting the gas in an exhaust stream of a gasoline engine with a catalytic material on a carrier, the catalytic material comprising an oxygen storage component that is about 50-90% by weight of the catalytic material and a palladium component consisting of about 10-150 g/ft$^3$ of palladium, wherein the palladium component is substantially the only platinum group metal component. Optionally, the catalytic material may comprise a second catalytic layer coated on the first catalytic layer, wherein the second catalytic layer is substantially similar to the first catalytic layer in composition. In a further aspect the catalytic material is coated on an undercoat comprising a high surface area refractory metal oxide, wherein the undercoat surface is substantially uniform. According to the invention this method is effective to maintain total hydrocarbons and nitrogen oxides in the exhaust of a 25 cc engine at less than 50 g/kW hour when the 25 cc engine is run at 7500 rpm for greater than 100 hours.

A further aspect provides a method of making a catalyst article, the method comprising: forming an undercoat on a carrier by coating a refractory metal oxide, preferably a high surface area refractory metal oxide, on the carrier. Coating may be accomplished by any of the coating methods known in the art, such as manual dipping or airbrushing. The undercoat is subsequently dried using heat and air, selecting the temperature and airflow such that a substantially uniform undercoat surface is formed. Typically, the drying temperature can be in the range of about 60-140° C. In a specific embodiment, drying of the undercoat layer is accomplished in the range of about 70-110° C., more specifically in the range of about 80-90° C. A gentle to moderate airflow is maintained across the carrier during drying of the undercoat, as may be provided by a conventional fan. The airflow may be provided by any suitable means, and will be determined by the size and/or configuration of the drying furnace. The undercoat layer is then calcined, typically at 490-550° C. for 1-2 hrs. The desired surface uniformity is determined by visual or microscopic methods, such as direct visualization by light microscopy, scanning electron micrographs, metallography, and the like. In a particular aspect, the undercoat is preferably thin, for example less than 10 µm in thickness. In further embodiments, the undercoat is 1-8 µm in thickness, 1-5 µm in thickness, 1-3 µm in thickness or about 1 µm in thickness. A thin undercoat and a substantially uniform undercoat surface increase adherence of the catalytic layer to the undercoat and to the carrier. At least one catalytic layer is coated on the undercoat. The catalytic layer coating is accomplished by depositing a catalytic material comprising a high amount of an OSC component (in certain aspects 50-90%, 60-80% or 65-70% by weight of the second layer) and a palladium component (in certain aspects about 10-150 g/ft$^3$, about 20-100 g/ft$^3$, about 25-75 g/ft$^3$ or about 65-70 g/ft$^3$ of palladium), wherein the palladium component is substantially the only platinum group metal component. The catalytic layer is then dried and calcined, typically at 490-550° C. for 1-2 hrs. A third layer may optionally be coated on the second layer. The third layer comprises substantially the same components as the second layer and is applied to the second layer using similar methods. The OSC in the second and/or third layers may be ceria-zirconia-lanthana and the lanthana-alumina in the first layer may be a high surface area lanthana-alumina, for example having a surface area of about 200 m$^2$/g. The second and/or third layers further comprise at least one refractory metal oxide, such as lanthana-alumina.

Details of the components of a catalyst article according to the invention are provided below.

The Carrier

According to one or more embodiments, the carrier may be any of those materials typically used for preparing TWC catalysts and will preferably comprise a metal or ceramic structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic carrier may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α-alumina, aluminosilicates and the like.

The carriers particularly useful for the layered catalyst composites of the present invention may also be metallic in nature and be composed of one or more metals or metal alloys. The metallic carriers may be employed in various shapes such as corrugated sheet, metal plate, wire mesh or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

The Catalytic Materials

The catalytic materials of the present invention may be formed in a single layer or multiple layers. In some instances, it may be suitable to prepare a single slurry of catalytic material and use this slurry to form multiple layers on the carrier. The materials can readily be prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member or wire mesh, which is sufficiently porous to permit the passage there through of the gas stream being treated.

The catalytic material can be prepared in layers on the carrier. For a first layer of a specific washcoat, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 g/in$^3$ per dip. To incorporate components such as platinum group metals (e.g., palladium, rhodium, platinum, and/or combinations of the same), stabilizers and/or promoters, such components may be incorporated in the slurry as a mixture of water soluble or water-dispersible compounds or complexes. Thereafter the coated carrier is calcined by heating, e.g., at 500-600° C. for about 1 to about 3 hours. Typically, when palladium is desired, the palladium component is utilized in the form of a compound or complex to achieve dispersion of the component on the refractory metal oxide support, e.g., activated alumina. A suitable method of preparing any layer of the layered catalyst composite of the invention is to prepare a mixture of a solution of a palladium compound and at least one support, such as a finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry. Additional palladium components may be impregnated in the refractory metal oxide component in a similar manner prior to addition to the slurry. It is particularly useful for realizing the advantages of the invention to provide a catalytic material comprising two different refractory metal oxides, for example one having high temperature resistance and another having high surface area, each of which is impregnated with the palladium component.

In one embodiment, the slurry is thereafter comminuted to result in substantially all of the solids having particle sizes of less than about 20 microns in an average diameter. The comminution may be accomplished in a ball mill or other similar equipment, and the solids content of the slurry may be, e.g., about 20-60 wt %, more particularly about 30-40 wt %. In a particular aspect of the present invention, the solids of the undercoat layer may have a particle size that is smaller than the particle size of the solids in the catalytic layer. In one embodiment, the undercoat particle size is about 6-8 microns and the catalytic layer particle size is about 13-14 microns.

Additional layers, i.e., a second catalytic layer, may be prepared and deposited upon the first layer in the same manner as described above for deposition of the first catalytic layer.

Before describing several exemplary embodiments of the invention, it is to be understood that the invention is not limited to the details of construction or process steps set forth in the following description. The invention is capable of other embodiments and of being practiced in various ways.

The following non-limiting examples shall serve to illustrate the various embodiments of the present invention. In each of the examples, the carrier was cordierite.

EXAMPLES

1. Formation of the Undercoat Layer

High surface area lanthana-stabilized alumina was mixed with zirconium oxide, aluminum acetate, octanol, acetic acid, alumina and DI water in a high speed mixer to form a slurry. The mixture was then milled to a particle size of about 7 μm (90%=6-8 μm) and used to coat a wire mesh substrate using deposition methods known in the art for depositing a washcoat on a metal substrate. The coated carrier was then dried at 80-90° C. in a drying oven at a temperature under air flow from a fan placed in the oven such that the surface of the undercoat layer after about 1-2 hours of drying exhibited no cracking, fissuring or flaking upon visual inspection under a standard light microscope. Drying was followed by calcining in a furnace at 530° C. for about 1-2 hours. The final undercoat composition contained the following components: lanthana-stabilized alumina 88.89% of dry gain (DG), aluminum acetate 4.44% of DG and zirconium oxide as acetate 6.67% of DG.

2. Formation of the Catalytic Layer

The palladium component in the form of a 38% solution was mixed with a high surface area lanthana-alumina and water to form a wet powder and achieve incipient wetness. Separately, the palladium component in the form of a 62% solution was mixed with a thermostable lanthana-alumina and water to form a wet powder and achieve incipient wetness. The two wet powder preparations were mixed and milled to a particle size of 90%=13-14 μm. Ceria-zirconia, octanol, acetic acid, a binder and zirconium acetate were added and combined with the Pd+ support mixture in a planetary mixer (P-mixer). The slurry was coated onto the wire mesh carrier over the undercoat layer using deposition methods known in the art for depositing the catalyst on a metal substrate. After coating, the carrier with the undercoat and catalytic layers was dried, then calcined at a temperature of 550° C. for about 1-2 hour. The final catalyst composition contained the following components: lanthana-stabilized alumina 17.8% of dry gain (DG), OSC 68.00% of DG, zirconium oxide as acetate 9.79% of DG and palladium 4.41% of DG.

3. Formation of an Optional Second Catalytic Layer

In catalyst articles where a second catalytic layer formed on the first catalytic layer was desired, the second catalytic layer was prepared as described in item 2 above and coated on the first catalytic layer using substantially similar procedures.

4. Vibration Testing of the Catalyst Article—Washcoat Adhesion (WCA)

Equipment/Tools: Crest variable power, multiple frequency ultrasonicator (bath model number 4HT-710-3-ST; generator model number 4G-250-3) or equivalent; temperature resistant gloves; mechanical convection oven or equivalent; 5 minute timer or equivalent; analytical balance (accurate to 0.1 mg); laboratory tongs.

Steps: The slurry washcoat adhesion test was performed on Volvo HP radiator minicores coated according to the methods of the invention as described above. The loadings on the HP minicores were in the range of 0.40-0.50 g/in$^3$. The approximate dimensions of the HP radiator minicores were ¾" (W)× ½" (H)×1.5"(D). The ¾" width (W) defines the width of two fin rows of the radiator. Uncoated minicores were weighed and the weight recorded as "Uncoated Core Weight" (UCW).

Coated minicores selected for testing were dried in a mechanical convection oven at 90±2° C. for 30 minutes, then removed from the oven and weighed immediately or placed directly in the desiccator if immediate weighing was not practical. The weight was recorded as "Minicore Weight After Drying 30 Minutes" (MWAD30). This weight was used to calculate the washcoat weight ("Coating Weight", CW) for the analysis as follows:

CW(g)=MCAD30−UCW

The minicore was then placed back into the oven for temperature treatment for an additional 4 hours at 90±2° C. to fully set the binder. The dried minicore was removed from the oven and weighed immediately or placed directly in the desiccator if immediate weighing was not practical. The weight was recorded to 0.0001 grams, along with the drying time and temperature.

The prepared minicore was placed in a 500 mL beaker at least ¾ full of DI water, standing "on end" such that one of the two faces of the minicore faced upwards (i.e. the direction of the minicore channels were perpendicular to the bottom of the beaker). The beaker was placed in the center of the ultrasonicator bath, ensuring that the water levels in the beaker and bath were equal. The sample was ultrasonicated for 5 minutes at low the frequency modulation setting and a power control setting of 6. The sample was removed, gently rinsed with deionized water and gently shaken to remove excess water. It was then dried in the oven at 90±2° C. for a minimum of 30 minutes. The dried minicore was removed from the oven, allowed to cool and weighed immediately or placed directly in the desiccator if immediate weighing was not practical. Weight to 0.0001 grams was recorded as the "Minicore Weight After Ultrasonication" (MWAU).

The Minicore Weight Loss (%) (MWL %) was then calculated according to the following equations:

$$MWL\ \% = \frac{(MWAD30 - MWAU) \times 100}{MWAD30}$$

The Washcoat Weight Loss % (WWL %) was calculated according to the following equations:

$$WWL\ \% = \frac{(MWAD30 - MWAU) \times 100}{CW}$$

Results: The results for washcoat adhesion obtained with minicores coated using the methods of the invention were compared to BASF's internal specifications for washcoat adhesion on minicores established for conventionally-prepared catalyst articles comprised of similar composition and components. Current WCA specifications for this type of catalyst article require no more than 18% weight loss in the ultrasonic bath test. Four separate WCA tests on four different production lots of catalyst articles made according to the methods of the invention resulted in weight loss of 11.13%, 6.22%, 6.37% and 0.51%. This represents a substantial and statistically significant reduction in loss of the washcoat as compared to the prior art under conditions of vibration simulating the operating conditions of a small engine.

5. Small Engine Operational Testing

Wire mesh carriers were coated according to the methods of the invention for testing in actual use for HC and NO$_x$ emission control in a 25 cc utility engine. For comparison, wire mesh carriers were coated with a tri-metal catalyst of the prior art (4Pt/10Pd/1Rh). This catalyst article is known to meet the current EPA emission requirements for emission performance and durability, i.e., total HC and $NO_x$ no more than 50 g/kW hr. Both catalyst articles contained 70 g/ft$^3$ of palladium.

The catalyst articles were placed in the 25 cc utility engine, which was run at 7500 rpm until HC+$NO_x$ emissions exceeded 50 g/kW hr. The tri-metal catalyst article reached the emissions limit at 100 hr of engine aging. In contrast, the catalyst article of the invention maintained emissions below the limit for substantially longer than 100 hr., even though the baseline for untreated emissions increased continuously during the course of the evaluation. Specifically, emissions were still well below 50 g/kW hr. at 150 hr. of engine aging. These results demonstrate the significantly extended emission performance and durability of the catalyst article of the invention.

What is claimed is:

1. A catalyst article for use in a small engine comprising:
    a first layer formed on a carrier substrate, wherein the first layer contains a refractory metal oxide component and has a substantially uniform surface, and;
    a second layer formed on the first layer, the second layer comprising i) an oxygen storage component that is about 50-90% by weight of the second layer and ii) a palladium component in an amount of about 10-150 g/ft$^3$ of palladium, wherein the palladium component is substantially the only platinum group metal component,
    wherein the catalyst article is effective to maintain total hydrocarbons and nitrogen oxides in an exhaust stream from a 25 cc engine at less than 50 g/kW hour when the 25 cc engine is run at 7500 rpm for greater than 100 hours.

2. The catalyst article of claim 1 wherein a particle size in the first layer is smaller than a particle size in the second layer.

3. The catalyst article of claim 1 wherein the refractory metal oxide is lanthana-alumina.

4. The catalyst article of claim 1 wherein the oxygen storage component is ceria-zirconia or ceria-zirconia-lanthana.

5. The catalyst article of claim 1 further comprising a third layer formed on the second layer, the third layer comprising an oxygen storage component that is about 50-90% by weight of the third layer and a platinum group metal component consisting of about 10-150 g/ft$^3$ of palladium.

6. The catalyst article of claim 1 wherein the second layer comprises about 20-100 g/ft$^3$ palladium or about 25-75 g/ft$^3$ palladium.

7. The catalyst article of claim 6 wherein the second layer comprises ceria-zirconia or ceria-zirconia-lanthana and about 65-70 g/ft$^3$ of palladium.

8. The catalyst article of claim 5 wherein the second and third layers each comprises ceria-zirconia or ceria-zirconia-lanthana and about 25-75 g/ft$^3$ of palladium.

9. A method of treating exhaust from a small engine comprising hydrocarbons and nitrogen oxides comprising:
    contacting the exhaust with a catalyst article, wherein the catalyst article comprises i) a first layer coated on a carrier, wherein the first layer contains a refractory metal oxide and has a surface that is substantially uniform, and ii) a second layer coated on the first layer, wherein the second layer comprises i) an oxygen storage component that is about 50-90% by weight of the second layer, and ii) a palladium component in an amount of about 10-150 g/ft$^3$ of palladium, wherein the palladium component is substantially the only platinum group metal component, wherein the method is effective to maintain total hydrocarbons and nitrogen oxides in the exhaust of a 25 cc engine at less than 50 g/kW hour when the 25 cc engine is run at 7500 rpm for greater than 100 hours.

10. The method of claim 9 wherein the exhaust is contacted with a catalyst article wherein the second layer comprises about 20-100 g/ft$^3$ palladium.

11. The method of claim 10 wherein the exhaust is contacted with a catalyst article wherein the second layer comprises about 65-70% ceria-zirconia or ceria-zirconia-lanthana and about 25-75 g/ft$^3$ of palladium.

12. The method of claim 10 wherein the exhaust is contacted with a catalyst article having a particle size in the first layer that is smaller than a particle size in the second layer.

13. The method of claim 10 wherein the refractory metal oxide is lanthana-alumina.

14. The method of claim 10 wherein the exhaust is contacted with a catalyst article further comprising a third layer formed on the second layer, the third layer comprising an oxygen storage component that is about 50-90% by weight of the third layer and a platinum group metal component consisting of about 10-150 g/ft$^3$ of palladium.

15. The method of claim 14 wherein the exhaust is contacted with a catalyst article wherein the second and third layers each comprise ceria-zirconia or ceria-zirconia-lanthana and about 25-75 g/ft$^3$ of palladium.

16. A method of making a catalyst article comprising:
    forming a first layer on a carrier by depositing a refractory metal oxide in an acidic sol on the carrier;
    drying the first layer at a temperature and airflow such that a substantially uniform surface is formed on the first layer;
    forming the second layer on the first layer by depositing a slurry on the first layer, the slurry comprising an oxygen storage component that provides about 50-90% by weight of the oxygen storage component in the second layer and a palladium component, wherein the palladium component is substantially the only platinum group metal component, and wherein the palladium is present in an amount sufficient to provide about 10-150 g/ft$^3$ of palladium in the second layer, and drying the second layer.

17. The method of claim 16 further comprising forming a third layer on the second layer, the third layer comprising an oxygen storage component that is about 50-90% by weight of the third layer and a platinum group metal component consisting of about 10-150 g/ft$^3$ of palladium.

18. The method of claim 16 wherein a second layer comprising about 20-100 g/ft$^3$ palladium is formed on the first layer.

19. The method of claim 18 wherein a second layer comprising ceria-zirconia or ceria-zirconia-lanthana and about 25-75 g/ft$^3$ of palladium is formed on the first layer.

20. The method of claim 17 wherein second and third layers each comprising ceria-zirconia or ceria-zirconia-lanthana and about 25-75 g/ft$^3$ of palladium are formed.

* * * * *